*R. Winans,*
*Steam-Engine Piston.*
N°19,888. Patented Apr. 6, 1858.
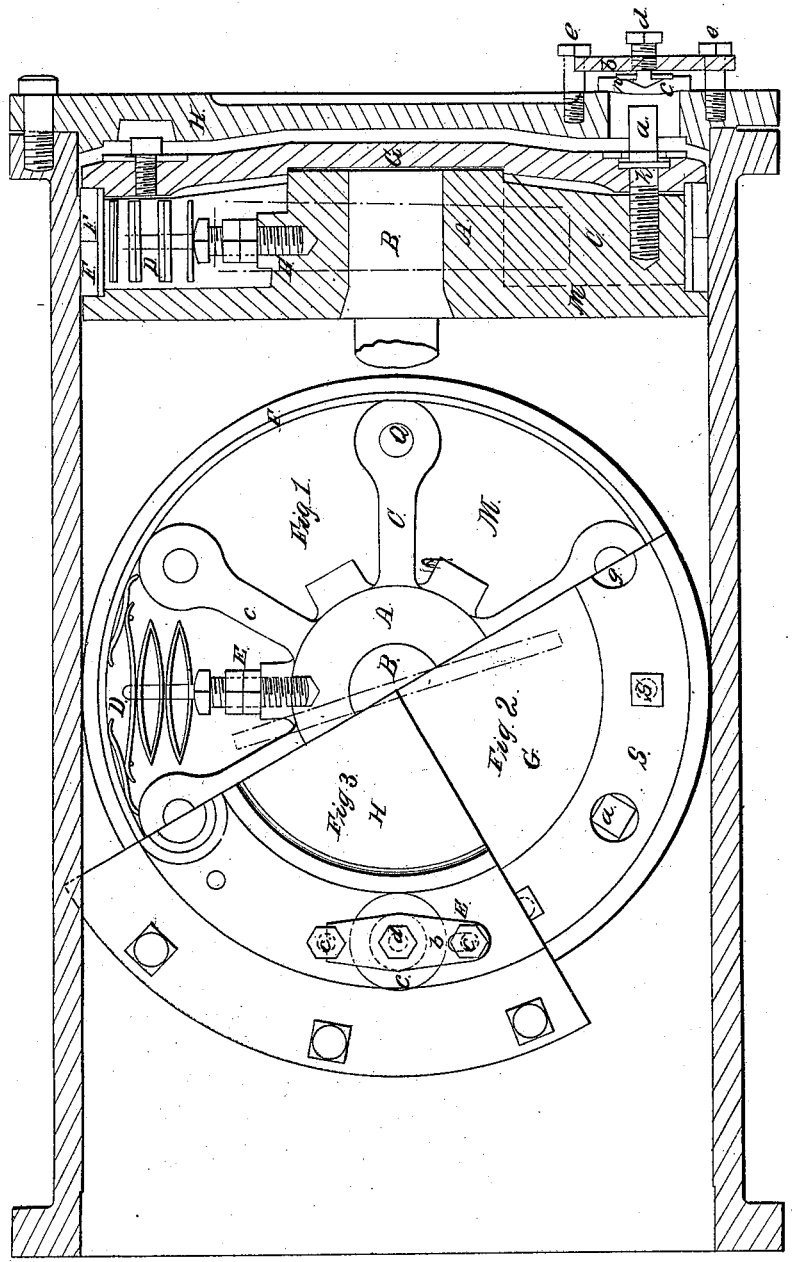

UNITED STATES PATENT OFFICE.

ROSS WINANS, OF BALTIMORE, MARYLAND.

PISTON FOR STEAM-ENGINES.

Specification of Letters Patent No. 19,888, dated April 6, 1858.

*To all whom it may concern:*

Be it known that I, Ross WINANS, of the city of Baltimore, in the State of Maryland, have invented a new and useful Improvement in Pistons for Steam-Engines, and that the following is a full and exact description of my said improvement.

Pistons with metallic packing may be said to consist of four principal parts, viz. 1st, the body of the piston consisting of a disk to which are attached in the casting, a hub to receive the piston rod, and arms for the bolts that confine the follower; 2d, the metalic rings forming the packing; 3d, the spring or springs by which the rings are pressed against the cylinder, and 4th, the follower. These several parts vary according to the fancy of the particular machinist; but the purpose of the whole combined, and forming, what is termed the piston, is to secure as far as practicable so close a contact between the periphery of the piston and the inner surface of the cylinder, that no steam shall pass between the two, while at the same time the piston moves to and fro in the cylinder with the least possible amount of friction under the circumstances. The efficiency of the whole engine is so dependent upon excellence in this particular, that great attention has been bestowed upon it. The hemp packing originally used was displaced by metallic packing, and the metallic packing has ever since been the subject of constant improvement.

The general idea of the metallic packing is a metallic ring or rings, either in one piece or in segments, but capable of being expanded by springs placed within the body of the piston, between the disk already mentioned and the follower.

Sometimes the springs are relied on to press the packing outward and it is afterward kept in its position by the follower being screwed down upon it, confining it between the follower and the disk. Sometimes the springs are alone relied on to keep the rings of the packing in close contact with the cylinder, but neither of these modes are free from objection. In the first mode, when the packing is once set, it is troublesome to readjust it, after wear, to do which the cylinder head must be taken off, a job that is generally postponed until the efficiency of the engine is much diminished by the leakage that has followed the wear and tear of the immovable packing. In the second mode the whole reliance is upon the springs, and it is difficult at all times to have these of exactly the proper strength, neither too strong so as to produce too great a friction, nor too weak so as to permit a leakage of steam.

It is well known that the packing of the same engine will wear differently at different times, and that it is a desideratum especially in locomotive engines, to have the power of adjusting it, without difficulty at the end of each trip, and if desirable at any stopping place during the trip, by means so easy as to prevent the engineman from wishing to avoid the trouble even. It is this desideratum that I have sought to accomplish by my improvement.

The plan of piston generally which I adopt is that where the springs having forced the rings into close contact with the inner surface of the cylinder, the follower is screwed down upon the rings, so as to keep them immovable, until the follower bolts are again slackened.

The body of the piston is made in the usual way except that I use six arms in place of the four commonly employed, and six sets of springs occupying the spaces between the arms, and strong enough to expand the rings into the closest contact with the cylinder. These springs should be multiplied in the respective sets, the better to follow up the successive wearing and expanding of the rings by the slacking of the follower, without material diminution in the tension, or ability of the springs to throw the rings out closely in contact with the cylinder when the follower bolts are slackened for this purpose. There are of course six bolts, one corresponding to each arm, that fastens the follower, and enable it to compress firmly and immovably, notwithstanding the pressure outward of the spring or inward of the steam, the rings between the follower, and the flange of the piston. So far there is nothing in my improvement that is not to be found in previous constructions, but in addition, to what is thus described, I make in the cylinder head, opposite to the head of each bolt in the follower, a hole large enough to introduce a wrench fitting the head of the bolt. The plan adapted by me for opening and closing these holes, I will describe hereafter.

Supposing now, a piston constructed, as I have described with the cylinder head perforated as above, and the engine to have completed its trip or to have reached a water station, or to be standing on a siding, all that the engineman has to do, to tighten, or set up his packing, if desirable, is to open the holes in the cylinder head in succession, using his wrench and giving each bolt a turn backward thereby loosening the follower—the follower loose, the springs press out the rings, taking up the wear instantly, when the engineman going around the holes again with his wrench, but this time turning each bolt forward, tightens the follower and confines the rings against the cylinder, until fresh wear makes it necessary to repeat the operation.

Collateral and subsidiary to my invention, it was necessary to provide a secure mode of closing the holes in the cylinder head, so as to permit them to be opened when required with facility; and it was necessary also to provide against the bolts in the follower becoming so loose, as to strike against the cylinder head. These two objects I have accomplished thus. I place over each hole in the cylinder head a closely fitting cover, kept in its place by a set screw, working in a bar, kept in place across the hole, by two screws in the cylinder head. One end of the bar has an oblong slot, and the other is made with a jaw only. To stop the hole, a cover is placed on it, the bar placed over it, the slotted ends permitting the jawed end to be slipped under the head of screw proper to it, when a turn of the set screw closes the cover and confines the bar at the same time. When the set screws are loosened, the bars fall down hanging by the slotted ends and the covers of the holes fall off leaving room for the admission of the wrench.

To prevent the follower bolts from working loose so as to do mischief, I make them with a shoulder or flange that fits into a counter sink on the follower, above which, fastened into a larger counter sink in the same by screws, is a flat thin ring of metal with a hole to admit the bolt head but not the shoulder. The counter sink for the shoulder is deep enough to permit the bolt to be screwed and unscrewed by a single turn or so, but prevents its working out of the follower so far as to be in danger of striking the cylinder head.

The accompanying drawings represent a cylinder in section with the piston at one end of the stroke. The piston is shown in the same drawing with the follower off in the half inside Fig. 1, and with the follower on in the quadrant No. 2, and the end of the cylinder or cylinder head is shown in quadrant No. 3.

The same letters represent corresponding parts throughout.

Thus M is the disk or bottom of the piston, A the hub, into which, the piston rod B is made secure, C the arms for the bolts to fasten the follower, Q the bolt holes, D the springs to expand the packing, E the set screws to compress the springs, F the metallic packing, G the follower, S the flat ring or guard plate, S' the screws which attach it to the follower, H the cylinder head.

a is the head of the follower bolt, g the hole in the guard plate, b the bar with its two screws e, e, and its set screw d, and c the cover for the holes in the cylinder head. The drawing shows the set screws to close the holes in the cylinder head have a guard disk or flange at n to prevent the set screw working out of the bar.

With the above references, the drawing explains itself on inspection.

To get at the follower bolts, the engineman has only to loosen the set screw d, Fig. 3, when the bar b drops on the slot shown at the letter E', and hangs on the screw there, the cover of the hole in the cylinder head C falling off at the same instant and exposing the bolt head ready for the wrench. The cover c being then replaced and the bar b being placed in position again, a turn on the set screw d completes the business. The drawing shows the metallic packing or rings confined by the screw a between the disk M and follower G.

This invention has a peculiar application to a locomotive engine, the rapidity of whose motion, the concussions and jars to which it is subjected, in consequence, the tendency of grit to work into the cylinders, when the engine is reversed, and the greatly increased wear and tear of the packing, as compared with the wear and tear in other engines, following from all these causes make it necessary to set up the packing, very many times oftener in the one case than the other, so as to convert what is a convenience in the one case to a necessity in the other.

Having thus described my improvement in the cylinder and piston of locomotive engines and pointed out some of the advantages resulting therefrom, what I claim as my invention and desire to secure by Letters Patent is—

The combination substantially as herein set forth of self-setting-packing that unaided by the skill of the engineer will adjust itself into close contact with the cylinder and bear against the same with the proper force: of means for binding this packing firmly in place when it has set itself out, and for slackening it again, when necessary, to allow it to re-set itself: and of means by which the packing can be easily loosened and tightened without removing the cylinder-head; whereby the packing of the piston of a locomotive can be adjusted better and in less time than by any combination previously invented.

ROSS WINANS.

Witnesses:
 THOMAS WINANS,
 JOSEPH AMES.